US006899756B2

(12) United States Patent
Nomura et al.

(10) Patent No.: US 6,899,756 B2
(45) Date of Patent: May 31, 2005

(54) DRIER FOR PRINTING INK AND PRINTING INK CONTAINING DRIER

(75) Inventors: Makoto Nomura, Tokyo (JP); Kosaku Nishiyama, Kawagoe (JP); Masanori Kasai, Tokyo (JP); Hideo Ishii, Saitama (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 10/384,535

(22) Filed: Mar. 11, 2003

(65) Prior Publication Data

US 2004/0040468 A1 Mar. 4, 2004

(30) Foreign Application Priority Data

Aug. 30, 2002 (JP) ........................................ 2002-253193

(51) Int. Cl.$^7$ ............................. C09D 11/00; C09F 9/00
(52) U.S. Cl. ................. 106/310; 106/31.35; 106/31.67
(58) Field of Search .............................. 106/310, 31.35, 106/31.67

(56) References Cited

U.S. PATENT DOCUMENTS

| | | | | |
|---|---|---|---|---|
| 3,046,153 A | | 7/1962 | Unkefer et al. ............. 106/310 |
| 3,367,901 A | | 2/1968 | Mutchler ................... 260/33.6 |
| 4,097,677 A | * | 6/1978 | Emmons et al. ............ 560/220 |
| 4,221,686 A | | 9/1980 | Sakiyama et al. ............. 260/23 |
| 4,255,196 A | * | 3/1981 | Emmons et al. ......... 106/31.66 |
| 4,311,624 A | * | 1/1982 | Emmons et al. ............. 524/322 |
| 4,604,952 A | * | 8/1986 | Daugherty ................... 101/451 |
| 4,756,760 A | * | 7/1988 | Rudolph ................... 106/31.66 |
| 4,764,215 A | * | 8/1988 | Rudolph ..................... 428/497 |
| 5,439,982 A | * | 8/1995 | Taylor et al. ................ 525/293 |
| 5,569,701 A | * | 10/1996 | Moynihan .................... 524/539 |
| 5,723,514 A | * | 3/1998 | Nachfolger et al. ........ 523/161 |
| 6,344,516 B1 | * | 2/2002 | Ikeda et al. .................. 524/717 |
| 6,451,926 B1 | * | 9/2002 | Kuo et al. ................... 525/403 |
| 6,565,645 B1 | * | 5/2003 | Klein et al. ................. 106/778 |
| 2002/0007080 A1 | * | 1/2002 | Thames et al. ............. 554/219 |

FOREIGN PATENT DOCUMENTS

| | | |
|---|---|---|
| DE | 1 004 750 | 3/1957 |
| EP | 0750026 A1 | 12/1996 |
| EP | 1 057 857 A2 | 12/2000 |
| GB | 2 019 865 A | 11/1979 |

OTHER PUBLICATIONS

European Search Report (partial) dated Oct. 31, 2003.
European Search Report dated Feb. 6, 2004.

* cited by examiner

*Primary Examiner*—Mark L. Bell
*Assistant Examiner*—Veronica F. Faison
(74) *Attorney, Agent, or Firm*—Armstrong, Kratz, Quintos, Hanson & Brooks, LLP

(57) ABSTRACT

A drier for oxidative polymerization-drying printing ink is provided, which does not contain cobalt capable of exerting an adverse influence on the environment and health and which is environmentally friendly. A printing ink containing the drier is also provided. The drier for oxidative polymerization-drying printing ink contains a cerium salt of a fatty acid and a manganese salt of a fatty acid.

8 Claims, No Drawings

DRIER FOR PRINTING INK AND PRINTING INK CONTAINING DRIER

BACKGROUND OF THE INVENTION

1. Field of the Invention

The present invention relates to a drier for an oxidative polymerization-drying printing ink, and to a printing ink containing the drier.

2. Description of Related Art

In oxidative polymerization-drying ink such as lithographic offset printing ink, a drier is added to accelerate drying after printing. As the drier, a manganese salt of a fatty acid and a cobalt salt of a fatty acid are commonly used alone or in combination.

Cobalt is classified as a heavy metal and is not innocuous, as is apparent from the data of the evaluation of toxicity in Table 1 shown hereinafter. It can be said that cobalt is a component which imposes an environmental burden among components contained in the lithographic offset printing ink. To obtain an lithographic offset printing ink which is environmentally friendly and contains less toxic component, it would be preferable not to use cobalt. However, when a calcium or iron salt of a fatty acid, which imposes less of an environmental burden and exerts less adverse influence on the environment, is used alone, the effectiveness as a drier is inadequate. Since a substitute therefor cannot be easily found, a drier containing manganese or cobalt is used at present.

An example of data obtained by making a comparison of toxicity between cobalt and manganese is shown in Table 1. As is apparent from the same table, cobalt is more toxic than manganese.

TABLE 1

Comparison of toxicity of cobalt and manganese (from the database: REGISTRY OF TOXIC EFFECTS OF CHEMICAL SUBSTANCES)

|  | $LD_{50}$ (rat, oral administration) |
| --- | --- |
| Cobalt metal | 6.17 g/kg |
| Manganese metal | 9.0 g/kg |
| Cobalt naphthenate (popular as drier) | 3.9 g/kg |
| Manganese naphthenate (popular as drier) | 6.0 g/kg |

In view of increasing concern about environmental problems, the amount of ink using vegetable oil as a raw material has recently increased. A petroleum-based solvent, which has hitherto been used often as a solvent for printing ink, is a typical volatile organic compound (also referred to as "VOC") and, therefore, trials have been made to replace it with vegetable oil to reduce the amount of the petroleum-based solvent. As used herein, VOC refers to organic compounds having a boiling point within a range from about 50 to 250° C. in accordance with the definition of WHO (World Health Organization) and examples thereof include benzene, toluene and xylene.

For example, printing ink, a VOC component of which is reduced and replaced by soybean oil, is commercially available. Because of poor drying properties compared with conventional ink, this ink is likely to cause a problem referred to as "poor blocking properties" wherein printed surfaces or the printing ink surface and a paper adhere to each other when sheets of printed matter are laid one upon another.

BRIEF SUMMARY OF THE INVENTION

An object of the present invention is to provide a drier for an oxidative polymerization-drying printing ink, which does not contain highly toxic cobalt and exerts less adverse influence on the environment and health, and to provide a printing ink containing the drier.

Another object of the present invention is to provide a drier for an oxidative polymerization-drying printing ink, capable of preventing poor blocking properties in environmentally friendly printing ink which contains soybean oil as a main component of a vehicle and has reduced VOC content, and to provide a printing ink containing the drier.

The present inventors have intensively researched to provide environmentally friendly printing ink having drying properties which do not impair the operability during printing, and thus the present invention has been completed.

A first mode of the drier for an oxidative polymerization-drying printing ink according to the present invention is a drier containing a cerium salt of a fatty acid and a manganese salt of a fatty acid.

When using a cerium salt of a fatty acid alone, effectiveness as a drier is not very good. However, drying properties suitable for printing inks can be obtained by using it in combination with a manganese salt of a fatty acid, and the use of cobalt, which is capable of exerting an adverse influence on the environment and health, can be avoided.

Another mode of the drier of the present invention is a drier containing a metal salt of a fatty acid, the metal salt containing cerium as at least 50% by weight of the metal content, and a manganese salt of a fatty acid. The drier imparts suitable drying properties to printing ink.

Still another mode is a drier containing an iron salt of a fatty acid and a manganese salt of a fatty acid.

When using an iron salt of a fatty acid alone, effectiveness as a drier is not very good. However, drying properties suitable for printing ink can be obtained by using it in combination with a manganese salt of a fatty acid, and the use of cobalt, which is capable of exerting an adverse influence on the environment and health, can be avoided.

Since iron is less expensive than cerium, raw material cost can be reduced. Inks tend to be colored brown by adding the iron salt, and therefore the use of the iron salt in ink of a light or pale color is limited. However, the amount of the iron salt can be reduced by using it in combination with the manganese salt and therefore utilization can be broadened by avoiding coloring of ink.

Cobalt-free ink can be provided by adding the drier in ink.

When a drier containing an iron salt of a fatty acid and a manganese salt of a fatty acid is added to printing ink having an increased content of soybean oil, drying properties of the ink are improved, and thus problems such as poor blocking properties described above are less likely to occur.

Effects of the Invention

According to the present invention, it is made possible to obtain a drier for an oxidative polymerization-drying ink, which does not contain cobalt which can exert an adverse influence on the environment and health, the drier having reduced manganese content. The drier of the present invention, which uses a cerium salt of a fatty acid in combination with a manganese salt of a fatty acid, is expected to exert less adverse influence on the environment and also exhibit similar drying acceleration properties as those of a conventional drier containing a cobalt salt of a fatty acid and a manganese salt of a fatty acid.

The drier of the present invention, which uses an iron salt of a fatty acid in combination with a manganese salt of a fatty acid, can reduce the necessary amount of the iron salt which is likely to cause a problem such as coloring of ink. Since the iron salt of a fatty acid is less expensive than the cerium salt of a fatty acid, the drier cost can be reduced.

In a printing ink which has reduced VOC content and contains soybean oil as a main component of a vehicle, poor blocking properties can be improved by the drier of the present invention.

DETAILED DESCRIPTION OF THE INVENTION (1) A first mode of the drier of the present invention is a drier comprising a cerium salt of a fatty acid and a manganese salt of a fatty acid.

As the cerium salt of a fatty acid and the manganese salt of a fatty acid, metal salts of fatty acids, such as metal salts of octylic acid, metal salts of naphthenic acid, or metal salts of neodecanoic acid can be used.

(2) A second mode of the drier of the present invention is a drier containing a metal salt of fatty acid, the metal salt containing cerium as at least 50% by weight of the metal content, and a manganese salt of a fatty acid. Although cerium is expensive, its amount of at least 50% by weight of the metal content of the metal salt makes it possible to sufficiently achieve the effects of the present invention. By using such a metal salt of a fatty acid in combination with a manganese salt of a fatty acid, the effects of cerium can be exerted and drying properties are superior compared with the case of using, as the drier, a manganese salt of a fatty acid alone.

(3) A third mode of the drier of the present invention is a drier containing an iron salt of a fatty acid and a manganese salt of a fatty acid. Examples of the iron salt of a fatty acid include iron salts of fatty acids such as octylic acid, naphthenic acid, and neodecanoic acid.

The drier for printing ink of the present invention is prepared by dissolving a metal salt of a fatty acid in fat, oil, a fatty acid ester, a high-boiling point petroleum-based solvent for printing ink, or a mixed solvent thereof. As the solvent, in which a metal salt of a fatty acid is dissolved, for example, vegetable oil such as soybean oil, and vegetable oil fatty acid ester such as soybean oil fatty acid ester can be used. The use thereof can reduce the content of the VOC component in ink.

The metal content of the drier for printing ink of the present invention is preferably from 3 to 12% by weight, and more preferably from 4 to 6% by weight.

The addition of the drier for printing ink of the present invention to oxidative polymerization drying printing ink can impart requisite drying properties to the printing ink. The drier for printing ink of the present invention is added to the printing ink in the manufacturing process of printing ink and is then uniformly dispersed in the printing ink by passing through a stirring process using a mixer or a kneading process using a roll mill.

Among the driers for printing ink of the present invention, a drier containing an iron salt of a fatty acid and a manganese salt of a fatty acid can impart requisite drying properties to the printing ink when it is added to printing ink, the content of the VOC component in the ink being reduced to less than 1% by using vegetable oils such as soybean oil and vegetable oil fatty acid esters such as soybean oil fatty acid alone or in combination.

Examples of the printing ink wherein the content of the VOC component is less than 1% include printing ink containing 20 to 60% by weight of at least one of soybean oil and soybean oil fatty acid ester. As the soybean oil fatty acid ester, for example, there can be used known fatty acid esters such as soybean oil fatty acid methyl ester, soybean oil fatty acid ethyl ester, soybean oil fatty acid n-butyl ester, soybean oil fatty acid tert-butyl ester, and soybean oil fatty acid 2-ethylhexyl ester.

Another example of the printing ink wherein the content of the VOC component is less than 1% includes printing ink which contains 20 to 60% by weight of at least one of soybean oil and soybean oil fatty acid ester and also has a soybean oil content of 20% by weight or more. As the tall oil fatty acid ester, for example, there can be used known fatty acid esters such as tall oil fatty acid methyl ester, tall oil fatty acid ethyl ester, tall oil fatty acid butyl ester, tall oil fatty acid 2-ethylhexyl ester, and tall oil fatty acid pentaerythritol ester.

When using the drier (1) in the printing ink, the drier containing a cerium salt of a fatty acid (metal content: 3% to 12%) is preferably added so that the resulting printing ink contains 0.003 to 0.36% by weight of cerium, while the drier containing a manganese salt of a fatty acid (metal content: 3% to 12%) is preferably added so that the resulting printing ink contains 0.003 to 0.12% by weight of manganese.

When using in a printing ink the drier (2) containing a metal salt of a fatty acid wherein the metal salt contains cerium as at least 50% by weight of the metal content, the drier containing a metal salt of a fatty acid wherein the metal salt contains cerium at least 50% by weight of the metal content (metal content: 3% to 12%) is preferably added to the printing ink so that the resulting printing ink contains 0.003 to 0.36% by weight of cerium, while the drier containing a manganese salt of a fatty acid (metal content: 3% to 12%) is preferably added to the printing ink so that the resulting printing ink contains 0.003 to 0.12% by weight of manganese.

When using the drier (3) containing a metal salt of a fatty acid in the printing ink, the drier containing an iron salt of a fatty acid (metal content: 3% to 12%) is preferably added to the printing ink so that the resulting printing ink contains 0.003 to 0.36% by weight of iron, while the drier containing a manganese salt of a fatty acid (metal content: 3% to 12%) is preferably added to the printing ink so that the resulting printing ink contains 0.003 to 0.12% by weight of manganese.

For example, a printing ink, a VOC component of which is reduced and replaced by soybean oil, is commercially available. Because of poor drying properties compared with conventional ink, this ink is likely to cause a problem referred to as "poor blocking properties" wherein printed surfaces or the printing ink surface and a paper adhere to each other when sheets of printed matter are laid one upon another. However, "poor blocking properties" can be eliminated or reduced by using the drier containing an iron salt of a fatty acid and a manganese salt of a fatty acid in the present invention.

The printing ink of the present invention may contain driers, coloring materials such as pigments, vehicles (varnish), and various additives for printing ink such as waxes.

The vehicle (varnish) can contain known resins for printing ink such as rosin-modified phenol resin, rosin ester, petroleum resin, alkyd resin, petroleum resin-modified rosin/phenol resin, petroleum resin-modified rosin ester, petroleum resin-modified alkyd resin, alkyd resin-modified rosin/phenol resin, alkyd resin-modified rosin ester, acrylic-modified rosin/phenol resin, acrylic-modified rosin ester, urethane-modified rosin/phenol resin, urethane-modified rosin ester, urethane-modified alkyd resin, epoxy-modified rosin/phenol resin, epoxy-modified rosin ester and epoxy-modified alkyd resin; vegetable oils such as linseed oil, soybean oil, tung oil, palm oil and castor oil; fatty acid esters such as soybean oil fatty acid methyl ester, soybean oil fatty acid butyl ester, soybean oil fatty acid isobutyl ester, soybean oil fatty acid 2-ethylhexyl ester, linseed oil fatty acid butyl ester, linseed oil fatty acid isobutyl ester, tall oil fatty acid butyl ester, tall oil fatty acid 2-ethylhexyl ester, tall fat octyl ester, tall oil fatty acid pentaerythritol ester, palm oil fatty acid methyl ester, palm oil fatty acid butyl ester, palm oil fatty acid isobutyl ester, palm oil fatty acid 2-ethylhexyl ester, castor oil fatty acid methyl ester, castor oil fatty acid butyl ester, castor oil fatty acid isobutyl ester and castor oil fatty acid 2-ethylhexyl ester; high-boiling point petroleum-based solvents which can be used in known printing ink; cheleting agents referred to as "aluminum chlete", for example, derivatives of aluminumn-butoxide, aluminum-iso-butoxide and aluminum-sec-butoxide, such as compounds wherein one of various groups such as n-butoxy group, iso-butoxy group and sec-butoxy group is substituted with ethyl acetate or methyl acetate; crosslinking agents other than cheleting agents, capable of crosslinking the above known resins, such as monomer or resin having an epoxy group, and monomer or resin having an isocyanate group; and antioxidants such as BHT; and the vehicle can be prepared by dissolving them with heating.

As the wax, for example, known waxes such as polyethylene wax, PTFE wax and SASOL wax can be used.

Furthermore, since the printing ink containing the drier of the present invention is an oxidative polymerization drying ink, the printing ink is dried when exposed to air during storage to form a film. Although this phenomenon is referred to as a film-forming phenomenon, catechin can be added to prevent film formation. Catechin is preferably added after preparing the printing ink, although timing of the addition is not specifically limited. Catechin may be uniformly dispersed in the printing ink while sufficiently stirring or may be kneaded using a roll mill. The amount to be added to the printing ink is preferably from 0.01 to 1.0% by weight.

Also a metal salt of boric acid can be used in combination with the drier for printing ink of the present invention.

EXAMPLES

The present invention will now be described by way of Examples; however, the present invention is not limited only to these Examples. In the Examples, parts and percentages are by weight unless otherwise specified.

Example 1 relates to a drier for printing ink, containing a cerium salt of a fatty acid and a manganese salt of a fatty acid.

Example 2 relates to a drier for printing ink, containing an iron salt of a fatty acid and a manganese salt of a fatty acid.

In Examples 1 and 2 and Comparative Examples 1 and 2, printing ink as a base, in which the drier is added, is prepared according to the following formulation.

| | |
|---|---|
| (a) Indigo base ink A manufactured by DAINIPPON INK AND CHEMICALS, INC. | 60 parts by weight |
| (b) Resin varnish 12X1153 manufactured by DAINIPPON INK AND CHEMICALS, INC. | 35 parts by weight |
| (c) AF-5 Solvent manufactured by NIPPON PETROCHEMICALS, INC. | 5 parts by weight |

The base ink (a) is prepared by dispersing a pigment in a varnish comprising rosin-modified phenol resin, fat or oil such as linseed oil and/or soybean oil, and a high-boiling point petroleum-based solvent.

The varnish (b) contains, as a main component, fat or oil such as rosin-modified phenol resin and linseed oil/soybean oil, and a high-boiling point petroleum-based solvent.

After mixing the components (a) to (c), a predetermined amount of the drier used in each case was added, followed by uniform dispersion using a roll mill to obtain printing ink, and then the resulting printing ink was subjected to drying tests.

The drying tests were conducted by the method described in Japanese Industrial Standard (JIS) K5701-1: "Method using a 4.4.3 C type drying testing machine" of "Method of testing lithographic ink (Part 1)".

Example 1

Two kinds of driers (1) and (2) were mixed in a predetermined amount shown in Table 2, and the resulting mixture was added to the above printing ink, and then the resulting ink was subjected to drying tests.

(1) Manganese naphthenate: manganese-based drier having a metal content of 5% (referred to as "Mn-5")
(2) Cerium-based drier which is a salt of a metal including cerium and octylic acid and has a metal content of 6% (referred to as "Ce-6")

Three different amounts, i.e., 0.1, 0.3, and 0.5%, of the manganese naphthenate drier were used, while four different amounts, i.e., 0, 0.5, 1.0, and 1.5%, of the drier containing a salt of octylic acid and metal were used.

Regarding Comparative Example 1, the manganese naphthenate drier alone is added to the printing ink.

The results of the drying tests are shown in Table 2.

TABLE 2

(Results of drying tests in Example 1)

|  | Example 1-1 | Example 1-2 | Example 1-3 | Comparative Example 1 |
|---|---|---|---|---|
| Ce-6 | 0.5% | 1.0% | 1.5% | 0.0% |
| Mn-5 0.1% | 700 min. | 620 min. | 500 min. | 880 min. |
| Mn-5 0.3% | 350 min. | 310 min. | 280 min. | 470 min. |
| Mn-5 0.5% | 270 min. | 240 min. | 210 min. | 350 min. |

The drying time of inks for sheet-fed printing varies depending on the purposes, but is preferably from 500 to 800 minutes at 25° C.

As is apparent from Table 2, when the amount of Mn-5 is reduced to 0.1%, the drying time exceeds 800 minutes in Comparative Example 1, while the drying time can be reduced to 800 minutes or less by adding 0.1% of Mn-5 and 0.5% of Ce-6 in the Examples. Also it is apparent that the drying time can be reduced by changing the amount of Mn-5 or Ce-6, if necessary.

Example 2

(1) Manganese naphthenate: manganese-based drier having a metal content of 5% (referred to as "Mn-5")
(2) Iron naphthenate: iron-based drier having a metal content of 5% (referred to as "Fe-5")

The driers (1) and (2) were mixed in a predetermined amount and the resulting mixture was added to the above printing ink, and then the resulting ink was subjected to a drying test.

Three different amounts, i.e., 0.1, 0.3, and 0.5%, of the manganese naphthenate drier were used, while four different amounts, i.e., 0, 0.5, 1.0, and 1.5%, of the iron naphthenate drier were used.

Regarding Comparative Example 2, the manganese naphthenate drier alone is added to the printing ink.

The results of the drying tests are shown in Table 3.

TABLE 3

(Results of drying tests in Example 2)

|  | Example 2-1 | Example 2-2 | Example 2-3 | Comparative Example 2 |
|---|---|---|---|---|
| Fe-5 | 0.5% | 1.0% | 1.5% | 0.0% |
| Mn-5 0.1% | 640 min. | 520 min. | 480 min. | 880 min. |
| Mn-5 0.3% | 350 min. | 270 min. | 260 min. | 470 min. |
| Mn-5 0.5% | 260 min. | 240 min. | 200 min. | 350 min. |

As is apparent from Table 3, when the amount of Mn-5 is reduced to 0.1%, the drying time exceeds 800 minutes in Comparative Example 2, while the drying time can be reduced to 800 minutes or less by adding 0.1% of Mn-5 and 0.5% of Fe-5 in Examples 2-1 to 2-3. Also it is apparent that the drying time can be reduced by changing the amount of Mn-5 or Fe-5, if necessary.

In Table 4, the drying time when using metal salts of various fatty acids alone in Comparative Examples 3 to 12 are shown for reference.

TABLE 4

|  | Comparative Example 3 | Comparative Example 4 | Comparative Example 5 | Comparative Example 6 | Comparative Example 7 |
|---|---|---|---|---|---|
| Mn-5 | 0.5% | 1.0% |  |  |  |
| Co-12 |  |  | 0.5% | 1.0% |  |
| Co-Na |  |  |  |  | 0.5% |
| Ce-6 |  |  |  |  |  |
| Fe-5 |  |  |  |  |  |
| drying time (min.) | 350 | 270 | 170 | 90 | 360 |

|  | Comparative Example 8 | Comparative Example 9 | Comparative Example 10 | Comparative Example 11 | Comparative Example 12 |
|---|---|---|---|---|---|
| Mn-5 |  |  |  |  |  |
| Co-12 |  |  |  |  |  |
| Co-Na | 1.0% |  |  |  |  |
| Ce-6 |  | 0.5% | 1.0% |  |  |
| Fe-5 |  |  |  | 0.5% | 1.0% |
| drying time (min.) | 200 | 1680< | 1680< | 1680< | 1680< |

In Table 4, Co—Na denotes a cobalt naphthenate drier which is a kind of cobalt metal salt and has a metal content of 6%. Also Co-12 denotes an octylic acid cobalt drier having a metal content of 12%.

Example 3

The printing ink of Example 3 is prepared by adding a drier containing an iron salt of a fatty acid and a manganese salt of a fatty acid to printing ink containing at least one of soybean oil and soybean oil fatty acid.

In Example 3 and Comparative Example 13, printing ink as a base, in which the drier is added, is prepared according to the following formulation.

| | |
|---|---|
| (a) Indigo base ink B manufactured by DAINIPPON INK AND CHEMICALS, INC. | 60 parts by weight |
| (b) Resin varnish B manufactured by DAINIPPON INK AND CHEMICALS, INC. | 35 parts by weight |
| (c) Soybean oil salad oil manufactured by Nisshin Oil Co., Ltd. | 5 parts by weight |

The base ink (a) is composed of a pigment, and a varnish comprising fat or oil such as rosin-modified phenol resin or soybean oil and a fatty acid ester such as soybean fatty acid ester.

The varnish (b) contains, as a main component, fat or oil such as rosin-modified phenol resin and soybean oil, and a fatty acid ester such as soybean fatty acid ester.

Regarding Comparative Example 13, a drier containing a manganese salt of a fatty acid and a cobalt salt of a fatty acid is added to the above printing ink.

Ink formulation and the results of the blocking tests are shown in Table 5.

TABLE 5

Ink formulation and results of blocking tests

| | Example 3 | Comparative Example 13 |
|---|---|---|
| Indigo base B | 60 | 60 |
| Varnish B | 33.4 | 34.8 |
| Soybean oil | 5 | 5 |
| Iron drier | 1.5 | 0 |
| Manganese drier | 0.1 | 0.1 |
| Cobalt drier | 0 | 0.1 |
| Total | 100.0 | 100.0 |
| Results of blocking test | 4.5 | 3 |

The blocking tests were conducted in the following procedure. After printing on a paper using ink, the printed papers were allowed to stand overnight under high-temperature and high-humidity conditions while pressure was applied after laying printed surfaces one upon another. On the next day, after peeling at the space between the printed surfaces, the peeled state was visually evaluated according to five-rank criteria (5 (excellent)>3>1 (poor)). In this Example, the blocking test was conducted at a temperature of 50° C. and a humidity of 80%.

The cases in which the printed surfaces were not sticking were rated as good. Even if the printed surfaces were stuck together, the cases in which less printed ink came off from the printed surfaces were rated as good.

Example 4

Regarding the printing ink of Example 4, a drier containing an iron salt of a fatty acid and a manganese salt of a fatty acid was added to printing ink containing at least one of soybean oil and tall oil fatty acid.

In Example 4 and Comparative Example 14, printing ink as a base, in which the drier was added, was prepared according to the following formulation.

| | |
|---|---|
| (a) Indigo base ink C manufactured by DAINIPPON INK AND CHEMICALS, INC. | 60 parts by weight |

-continued

| | |
|---|---|
| (b) Resin varnish C manufactured by DAINIPPON INK AND CHEMICALS, INC. | 35 parts by weight |
| (c) Soybean oil salad oil manufactured by Nisshin Oil Co., Ltd. | 5 parts by weight |

The base ink (a) is composed of a pigment, and a varnish comprising fat or oil such as rosin-modified phenol resin or soybean oil and fatty acid ester such as tall oil fatty acid ester.

The varnish (b) contains, as a main component, fat or oil such as rosin-modified phenol resin or soybean oil and fatty acid ester such as tall oil fatty acid ester.

Regarding the printing ink of Comparative Example 4, a drier containing a manganese salt of a fatty acid and a cobalt salt of fatty acid is added to the above printing ink.

Ink formulation and the results of the blocking test are shown in Table 6.

TABLE 6

Ink formulation and results of blocking tests

| | Example 4 | Comparative Example 14 |
|---|---|---|
| Indigo base C | 60 | 60 |
| Varnish C | 33.4 | 34.8 |
| Soybean oil | 5 | 5 |
| Iron drier | 1.5 | 0 |
| Manganese drier | 0.1 | 0.1 |
| Cobalt drier | 0 | 0.1 |
| Total | 100.0 | 100.0 |
| Results of blocking test | 4.5 | 3 |

What is claimed is:

1. A drier for an oxidative polymerization-drying printing ink, comprising a metal salt of fatty acid, the metal salt containing cerium is at least 50% by weight of the metal content, and a manganese salt of a fatty acid.

2. A drier for an oxidative polymerization-drying printing ink, comprising an iron salt of a fatty acid and a manganese salt of a fatty acid.

3. Printing ink comprising the drier of any one of claims 1 to 3.

4. Printing ink containing the drier of any one of claims 1 to 3, wherein the content of a volatile organic compound is less than 1% by weight.

5. Printing ink according to claim 4, comprising 20 to 60% by weight of at least one of soybean oil and soybean oil fatty acid ester.

6. Printing ink according to claim 4, comprising 20 to 60% by weight of at least one of soybean oil and tall oil fatty acid ester, wherein the content of soybean oil is 20% by weight or more.

7. Printing ink comprising the drier of claim 1, wherein the content of cerium and metal is from 0.003 to 0.36% by weight and the content of manganese is from 0.003 to 0.12% by weight.

8. Printing ink comprising the drier of claim 2, wherein the content of iron is from 0.003 to 0.36% by weight and the content of manganese is from 0.003 to 0.12% by weight.

* * * * *